(12) United States Patent
Martin

(10) Patent No.: US 6,931,114 B1
(45) Date of Patent: Aug. 16, 2005

(54) VOICE CHAT SERVICE ON TELEPHONE NETWORKS

(75) Inventor: Dannie E. Martin, Casselberry, FL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 600 days.

(21) Appl. No.: 09/742,378

(22) Filed: Dec. 22, 2000

(51) Int. Cl.$^7$ ................................................. H04M 3/56
(52) U.S. Cl. ............................. 379/203.01; 379/88.6; 379/93.21; 709/204; 709/206; 370/261
(58) Field of Search ........................... 379/152, 121.01, 379/202.01–207.01, 88.74, 93.21, 114.19, 379/88.04; 709/227, 204, 205, 229, 206; 370/352, 261; 348/14.11, 14.01; 455/412.1, 455/413; 705/39; 345/753, 738; 704/269; 725/110

(56) References Cited

U.S. PATENT DOCUMENTS

| | | | |
|---|---|---|---|
| 3,912,874 A | 10/1975 | Botterell et al. | |
| 4,232,198 A | 11/1980 | Warman | |
| 5,473,605 A * | 12/1995 | Grube et al. | 370/261 |
| 5,721,763 A * | 2/1998 | Joseph et al. | 379/88.04 |
| 6,046,762 A * | 4/2000 | Sonesh et al. | 348/14.11 |
| 6,175,619 B1 * | 1/2001 | DeSimone | 379/202.01 |
| 6,339,784 B1 * | 1/2002 | Morris et al. | 709/204 |
| 6,389,114 B1 * | 5/2002 | Dowens et al. | 379/52 |
| 6,425,012 B1 * | 7/2002 | Trovato et al. | 709/227 |
| 6,430,276 B1 * | 8/2002 | Bouvier et al. | 379/121.01 |
| 6,459,892 B2 * | 10/2002 | Burgan et al. | 455/412.1 |
| 6,577,721 B1 * | 6/2003 | Vainio et al. | 379/202.01 |
| 6,614,783 B1 * | 9/2003 | Sonesh et al. | 370/352 |
| 2002/0021307 A1 * | 2/2002 | Glenn et al. | 345/753 |
| 2002/0059138 A1 * | 5/2002 | Priest et al. | 705/39 |
| 2002/0059379 A1 * | 5/2002 | Harvey et al. | 709/205 |
| 2004/0147248 A1 * | 7/2004 | Will | 455/413 |

\* cited by examiner

Primary Examiner—Fan Tsang
Assistant Examiner—Md. Shafind Alam Elahee
(74) Attorney, Agent, or Firm—Withers & Keys, LLC

(57) ABSTRACT

The present invention is system and method for holding voice chat over a telephone network. An embodiment for implementing the invention can comprise the following steps. First, a caller accesses the chat service by dialing a telephone number that is associated with the service of the present invention. Second, the caller is routed to a conference bridge circuit. Third, the subscriber enters a public chat room. Fourth, the subscriber participates in the public chat room that he or she had entered. While in the public chat room, the subscriber hears the voices of other chatters in the public chat room, and those chatters hear the subscriber's voice when the subscriber speaks. Fifth, at anytime, the subscriber may leave the public chat room by pressing an appropriate key on the keypad. In the preferred embodiment, two or more chatters may request to be placed in a private chat room for a private discussion that is not heard by other chatters of the public chat room.

18 Claims, 5 Drawing Sheets

VOICE CHAT SERVICE ON TELEPHONE NETWORKS

BACKGROUND

1. Field of the Invention

The present invention relates generally to telecommunication, and more particularly to voice chat services over telephone networks.

2. Background of the Invention

Live "chat" on the Internet has become one of the most popular ways to communicate. Participants of Internet chat often express their ideas freely because each of them may remain anonymous. Chatters on the Internet can discuss just about anything during an Internet chat session. There are literally thousands of chat rooms, each of which can be dedicated for a specific topic. Each chat room is also known as a channel. Internet chat channels are maintained by different people on different servers around the world. Some servers have a small number of channels, other servers have a large number of channels. Chatters go "online" to chat using a computer over the Internet.

During an Internet chat session, chatters do not actually hear each other in the chat rooms. Instead, they communicate with each other using their keyboards. A chatter types words on his or her computer during an Internet chat session, and other people can see those words on their computer immediately, and vice versa. Many chatters can participate in the "conversation" simultaneously. The chatters can be located any where in the world.

Although Internet chat services are very popular, they continue to suffer from several shortcomings, which include: (1) each of the chatters must have a computer with certain requirements; (2) the participants must have access to the Internet; and (3) communications among the participants are limited to text messages that are input through their keyboards.

Currently, voice chat services are not available to telephone users over existing telephone networks. Using the current "3-way calling" technology, more than two persons may participate in a conference call using their telephones. The parties of the conference call normally know the identities and telephone numbers of other parties to enable the conference call to take place. Thus, the 3-way calling technology is not desirable for voice chat services because participants could not remain anonymous. U.S. Pat. Nos. 3,912,874 and 4,232,198 disclose a conference arrangement and a device for use in establishing telephone conference calls, respectively. These references are incorporated herein by reference in their entirety.

Accordingly, there is a need to expand Internet chat services to telephone networks. There is a need for a system and a method through which people may anonymously participate in a voice chat with using a PSTN telephone, a cellular telephone, and a digital telephone.

SUMMARY OF THE INVENTION

The present invention is system and method for providing voice chat services over telephone networks. The present invention can enable a plurality of telephone users to have voice communications among themselves without revealing their identities or telephone numbers. The system architecture comprises at least one conference bridge circuit (CBC) in the telephone network. A caller can access the chat service by dialing a telephone number that is associated with the CBC. The telephone number may be, for example, 1-800-CHAT-NOW.

When the caller (the subscriber) is connected to the CBC, the system routes the caller to a chat room in which he can participate as a chatter, contributing to a topic of common interest among all the chatters in that chat room. In the preferred embodiment, the subscriber can be initially offered a "main menu," at which the subscriber is given a plurality of main topics, each of which is associated with a chat room or channel. For example, one topic may be about sports, and another topic may be related to music. After the subscriber has chosen one of the broad topics, the subscriber can be offered a plurality of sub-topics within each broad topic. For example, a subscriber who has selected the "Sports" topic may be subsequently prompted to choose one of several subtopics including, for example, "Football" and "Baseball." An additional CBC is required for each subtopic or sub-channel. The menu can be implemented using one of several technologies. For example, standard menu-driven technology with or without voice command capabilities may be used.

Once the subscriber has selected the subtopic or sub-channel of interest, the subscriber can be led to a chat room, in which the subscriber can hear an existing conversations of other chatters who had already entered the chat room. When the subscriber speaks, other chatters can hear the subscriber's voice. Such chat room is hereinafter referred to as a "public" chat room. In the preferred embodiment, two or more chatters in a public chat room may enter a "private" chat room for a more private discussion. Chatters who remain in the public chat room do not hear the conversation in the private chat room. A chatter can be required to provide a unique user ID number assigned to him or her before the system allows the chatter to enter the private chat room.

During a session in a chat room, public or private, a subscriber or chatter may press one or more keys on his or her telephone keypad to execute a command. The command may result in exiting the chat room, entering a different chat room, or obtaining help from a customer service representative. For example, the subscriber may press "9" to return to a chat room previously visited, "0" for the main menu, and "611" for a customer service representative.

Accordingly, it is an object of the present invention to provide voice chat services to telephone service subscribers.

It is another object of the present invention to increase available venues through which telephone subscribers may exchange information among themselves.

It is another object of the present invention to enable a plurality of persons to discuss anonymously during a telephone communication session.

It is another object of the present invention to enable a subset of persons in a public chat room to enter a private room for a more private discussion.

These and other objects of the present invention are described in greater detail in the detailed description of the invention, the appended drawings, and the attached claims.

DETAILED DESCRIPTION OF THE INVENTION

The present invention is a system and method for providing voice chat services over one or more telephone networks. The telephone network may comprise one or more of public switched telephone network (PSTN), cellular, personal communications service (PCS), and other wireless networks. The present invention can use standard bridge conference line technology. Voice service chat room can be offered to subscribers of the telephone networks with the addition of at least one conference bridge circuit that is accessible by the telephone networks.

Figure 1:
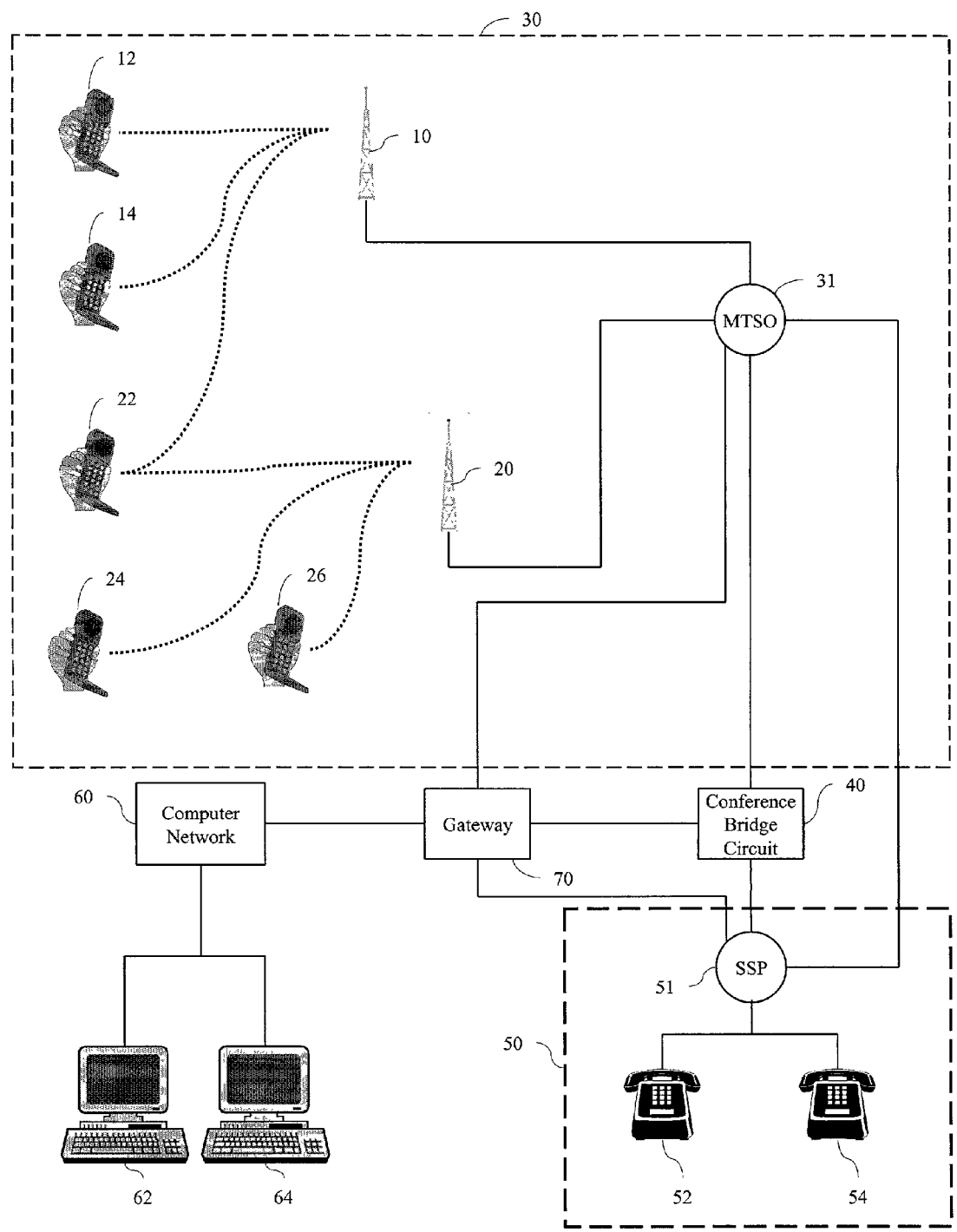
FIG. 1 is a schematic diagram illustrating the system architecture of an embodiment of the present invention.

FIG. 1 is a schematic diagram illustrating the system architecture of an embodiment of the present invention. Wireless telephones 12, 14, 22, 24, and 26 are in wireless communications with base stations 10 and 20. Base stations 10 and 20 are in communication with mobile telephone switching office (MTSO) 31. Wireless telephones 12, 14, 22, 24, and 26, base stations 10 and 20, and MTSO 31 are nodes or components of wireless communication network (WIN) 30. Wireline telephones 52 and 54, and service switching point (SSP) 51 are part of PSTN 50. A communication link may be established between any of the wireless and wireline telephones through one or more of base stations 10 and 20, MTSO 31, and SSP 51. Computers 62 and 64 are in communication with computer network 60. Computer network 60 is preferably the Internet. Computers 62 and 64 may establish a communication link with any of wireless telephones 12, 14, 22, 24, and 26, and wireline telephones 52 and 54 through gateway 70. Voice-over-Internet protocol (VoIP) may be used.

Conference bridge circuit (CBC) 40 can facilitate a voice chat service comprising chatters using any of computers 62 and 64 and telephones 12, 14, 22, 24, 26, 52, and 54. CBC 40 is shown in FIG. 1 as a component independent of WCN 30, PSTN 50, and computer network 60. Therefore, a business entity other than a telephone company may provide the service of the present invention. CBC 40 could also be a component or a node of one of WCN 30, PSTN 50, and computer network 60. In the preferred embodiment, CBC 40 is preferably a component of WCN 30.

Figure 2:
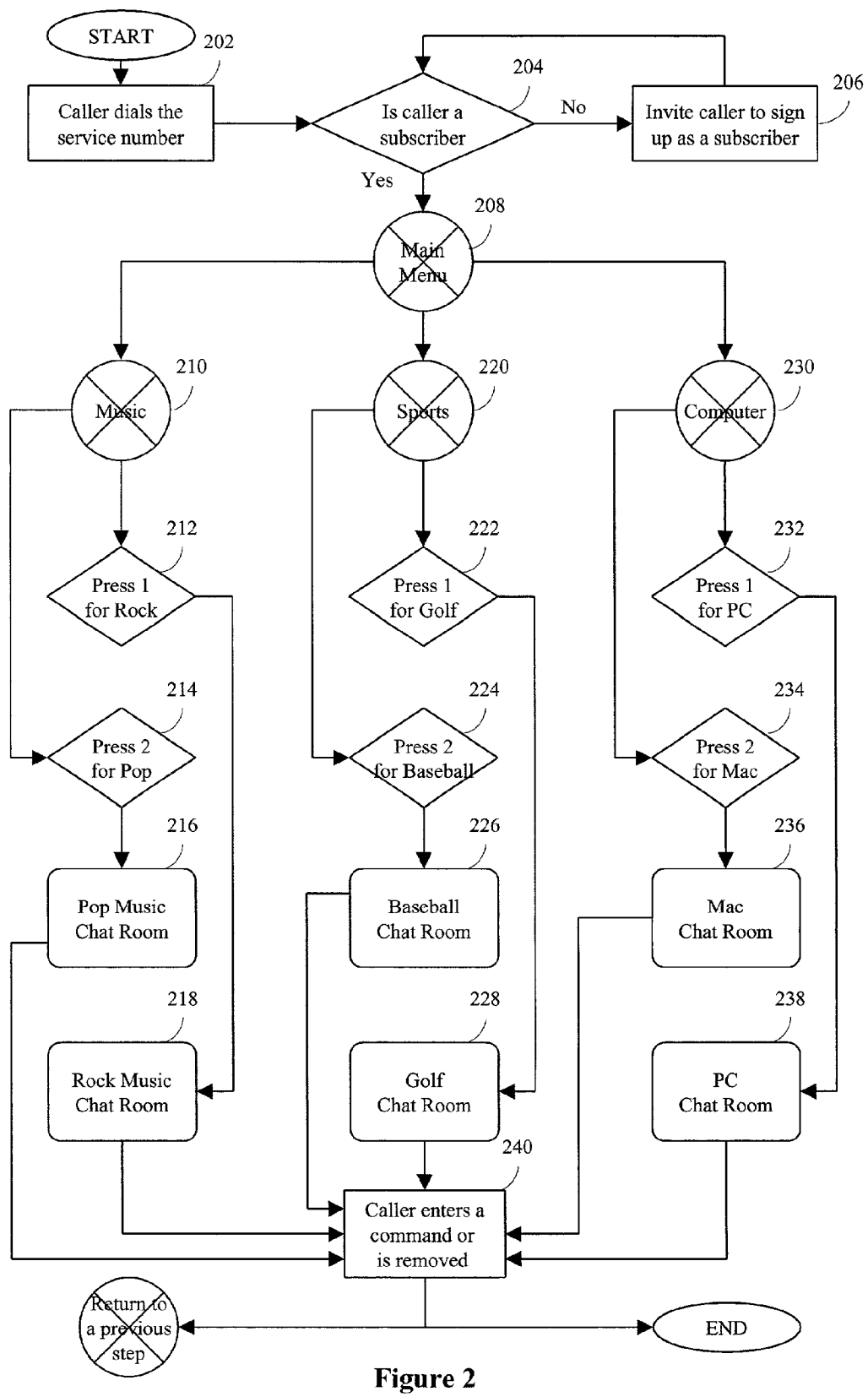
FIG. 2 is a flowchart illustrating the general steps involved in using an embodiment of the present invention.

FIG. 2 is a flowchart illustrating the general steps involved in using an embodiment of the present invention. In step 202, a caller dials a telephone number that is associated with the service of the present invention. The telephone number may be, for example, 1-800-CHAT-NOW. The caller who dialed the telephone number can be connected to a CBC, such as CBC 40 shown in FIG. 1. Routing of the call may be performed using known technologies, including advanced intelligent network (AIN) and wireless intelligent network (WIN). The caller may use a wireless telephone of WCN 30, a wireline telephone of PSTN 50, or a computer via computer network 60.

In step 204, a verification process can be performed to determine whether the caller is an authorized user or a subscriber of the service. The verification may be performed in one of several methods. In a first method, the caller can be required to enter a password or a personal identification number (PIN) to identify himself or herself as a subscriber. Other user verification methods can include, for example, checking the caller's mobile identification number (MIN) if the caller uses a wireless telephone. The caller's MIN or other identity information may be obtained from, for example, a home location register (HLR) of WCN 30 if the caller is a subscriber of WCN 30. If the caller is not a subscriber of WCN 30, the caller's identity information may be obtained from a visitor location register (VLR). If the caller uses a wireline telephone of PSTN 50, the caller's calling party number and other identity information may be obtained from a service control point (SCP) of PSTN 50.

If the caller is not a subscriber of the service of the present invention, the system can, in step 206, invite the caller to sign up as a subscriber. The subscription can be for a term as short as "this call only." The subscription can also be for a longer term.

If the caller was verified in step 204 to be a subscriber, the process goes to step 208 in which the subscriber can be greeted. The subscriber can also be given a "main menu." The main menu can comprise a plurality of options. Each option can represent a main topic. For example, the subscriber may be prompted to press "1" to select the "Music" topic; "2" to select the "Sports" topic; and "3" to select the "Computer" topic.

After the subscriber presses one of the key in step 208, the process goes to one of steps 210, 220, and 230, in which the subscriber can be further offered additional options or subtopics. For example, if the subscriber had pressed "1" in step 208, the subscriber may be asked, in step 210, to press "1" for "Rock" and "2" for "Pop." If the subscriber presses "1" in step 212, the subscriber enters the Rock Music chat room in step 218. If the subscriber presses "2" in step 214, the subscriber enters the Pop Music chat room in step 216.

While in either step 216 or step 218, the subscriber can hear the voices of other chatters that had already entered the chat room. The subscriber may join in the conversation and other chatters will hear the subscriber's voice. Steps 220 through 228 and steps 230 through 238 are similar to corresponding steps 210 through 218 described above. If the subscriber had entered the Pop Music chat room in step 216, the subscriber would preferably be provided with an announcement: "You have entered the Pop Music public chat room." A similar announcement may be heard by the subscriber in steps 218, 226, 228, 236, and 238 if the subscriber had entered one of those chat rooms. A CBC can be provided and dedicated for each of these chat rooms.

In step 240, while the subscriber is in one of the chat rooms, the subscriber may press one or more buttons on the keypad of his or her telephone to execute a command. The command may be to enter a different chat room, access the main menu, enter a private chat room, or obtain help from a customer service representative. For example, if the subscriber is in the Pop Music chat room in step 216, the subscriber may press "9" to return to step 210, and then press "1" to enter the Rock Music chat room in step 218. The subscriber may also press "0" to return to step 208, followed by "3" and "1" to enter the PC Computer chat room. Furthermore, the subscriber may press, for example, "611" to get in touch with a customer service representative of the chat service.

It is also possible that in step 240 the subscriber may be removed from the chat room by the system. For example, if the subscriber is in one of the chat rooms on a trial-membership basis, the subscriber may be removed from the chat room and be directed to step 206 in which the subscriber can be offered to join the service. Similarly, the subscriber may be removed from the chat room if the subscriber does not participate in accordance with the rules of the service. The rules may comprise, for example, a prohibition against the use of language involving profanity, racism, or other undesirable contents.

The present invention can also provide a method that allows two or more chatters in a public chat room, e.g., one of the chat rooms in steps 216, 218, 226, 228, 236, and 238, to go to a private chat room. The private chat room allows a subset of interested chatters in any public chat room to have a private conversation not heard by other chatters of the public chat room. Using a unique ID number assigned to each of the chatters, for example, an interested chatter may be placed in the private chat room.

Figure 3:
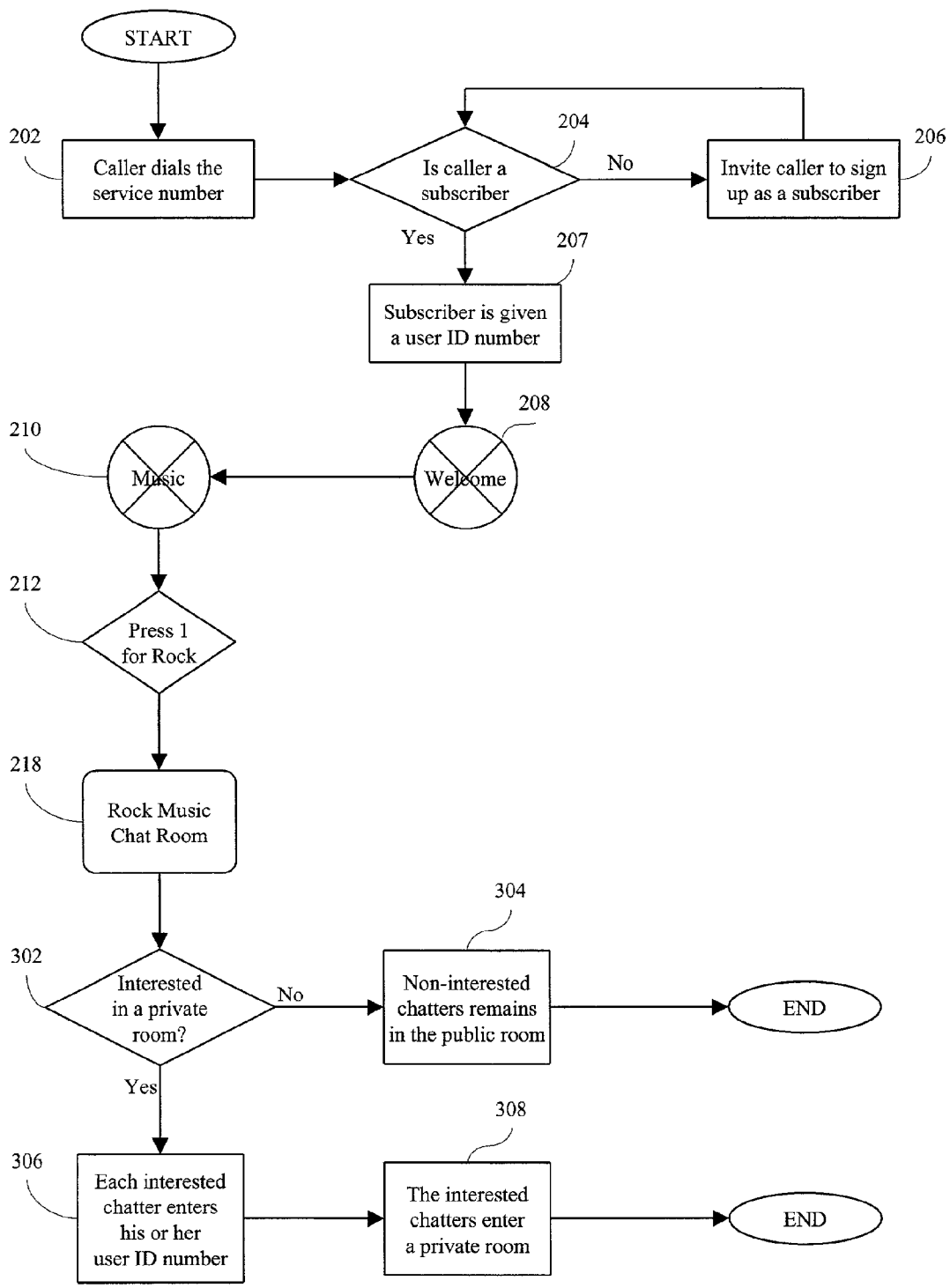
FIG. 3 is a flowchart illustrating the steps involved in using an embodiment of a private chat room feature of the present invention.

FIG. 3 is a flowchart illustrating the steps involved in using an embodiment of a private chat room feature of the present invention. Steps 202 through 206 shown in FIG. 3 are similar to corresponding steps 202 through 206 shown in FIG. 2 and described above. In step 207, the subscriber can be given a user ID number for private chat room purposes. The user ID number may be a "permanent" user number assigned to the subscriber for as long as the subscriber maintains his or her subscription. Such permanent user ID number may be desirable by those subscribers who want to be identified by other chatters or subscribers by their permanent user ID numbers. Subscribers with permanent ID user numbers may also use the permanent ID user numbers in step 204 for verification purposes. Alternatively, a subscriber may be assigned a temporary user ID number. The temporary user ID number may be good for one-time use only. The subscriber may therefore have a different user ID number for each chat session. The user ID number, permanent or temporary, may be provided to the subscriber via one of several methods. For example, the subscriber may be provided with the user ID number at the time of the call, by mail, or through an electronic system such as an e-mail system. The use of a temporary user ID number can protect the subscriber's privacy.

Step 208, 210, 212 and 218 shown in FIG. 3 are similar to the corresponding steps shown in FIG. 2 and described above. For discussion purposes, it is assumed that there are more than four chatters in the Rock Music public chat room carrying on a conversation in step 218. Each of the chatters has a unique user ID number, either a permanent one or a temporary one. Assume further that two of the chatters in the Rock Music public chat room desire to discuss further with each other without participation from the remaining chatters in the Rock Music public chat room.

In step 302, depending on the interest of the chatters, two alternatives exist for the chatters in the public chat room to further their conversation. In step 304, those who are not interested in entering a private chat room simply continue their conversation in the Rock Music public chat room. In step 306, one of the two chatters who are interested in entering the private chat room (the interested chatters), may press a button on the keypad of his or her telephone. That chatter may then be connected to an operator to whom the chatter provides his user ID number and the user ID number of the other interested chatter. Alternatively, each interested chatters must provide his or her own user ID number to the operator. The operator may be a customer service representative or an automated system. If a chatter or subscriber does not remember his or her user ID number, the chatter may press a button or key, for example the "*" key, at anytime to get his or her current user ID number from the system.

In step 308, the interested chatters can exit the Rock Music public chat room, and enter the private chat room after supplying the user ID numbers. While in the private chat room, the interested chatters do not hear the conversation in the Rock Music public chat room, and those who remain in the Rock Music public chat room do not hear the conversation of the interested chatter in the private chat room.

In any of the chat rooms, the conversation may or may not be moderated. A moderated chat room may comprise, for example, a designated representative of the chat service provider as a participant. The designated representative may, for example, remove one or more chatters from the chat room if the chatters do not comply with the rules of the service. The chat service provider may require a higher subscription fee for moderated chat rooms. The designated representative may serve as an operator that facilitates two or more interested chatters to enter a private chat room.

Subscribers of the present invention may be billed in a number of different ways. For example, the subscribers may pay a flat monthly fee or they may pay based on the amount of time spent in the chat rooms. Private chat room services may be provided to the subscribers at a higher fee.

Figure 4:
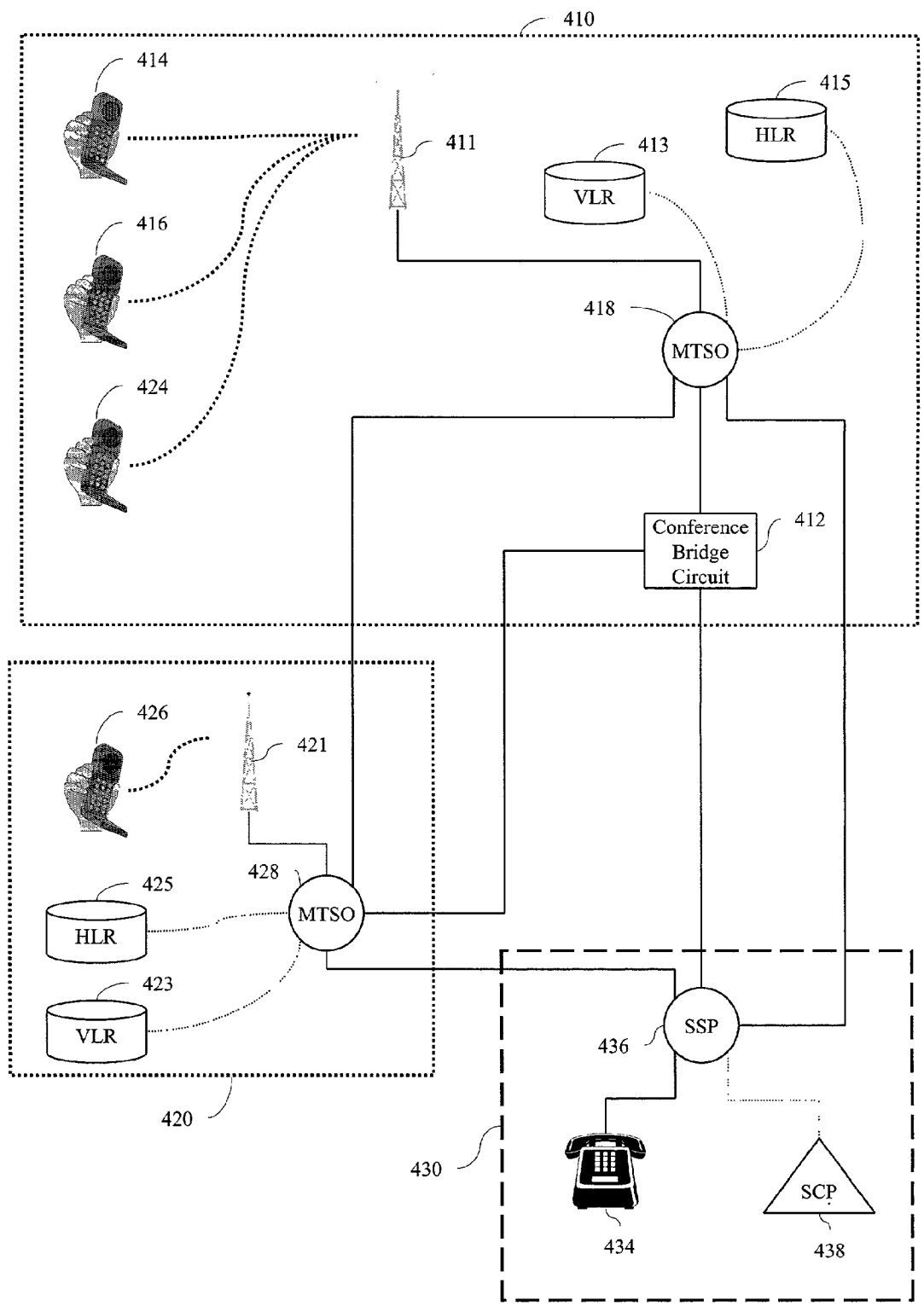
FIG. 4 is a schematic diagram illustrating the system architecture of the preferred embodiment of the present invention.

FIG. 4 is a schematic diagram illustrating the system architecture of the preferred embodiment of the present invention. In the preferred embodiment, the chat service of the present invention is provided by WCN 410 that comprises CBC 412. The chat service can be accessible by customers of WCN 410, such as those using wireless telephones 414 and 416. The chat service can also be accessible by customers of other telephone networks, including WCN 420 and PSTN 430. Wireless telephones 424 and 426 are used by customers of WCN 420, and wireline telephone 434 belongs to a customer of PSTN 430.

In addition to CBC 412, other components or nodes of WCN 410 can include MTSO 418, base station 411, HLR 415, and VLR 413. When wireless telephones 414 and 416 are in communication with base station 411, caller information such as the name of the caller may be obtained from HLR 415. Similarly, a non-network user, such as wireless telephone 424, may be identified using VLR 413.

MTSO 428, base station 421, wireless telephone 424 and 426, HLR 425 and VLR 423 are components or nodes of WCN 420. As shown in FIG. 4, although wireless telephone 424 is part of WCN 420, wireless telephone 424 can be located within the service area of WCN 410. For example, wireless 424 may be in a "roaming" situation.

Wireline telephone 434, SCP 438, and SSP 436 are components or nodes of PSTN 430. SSP 436 is a switch that can connect wireline telephone 434 with other switches or circuits, including MSTO 418, MTSO 428, and CBC 412. MTSO 418, MTSO 428, SSP 436, and CBC 412 can be in wireless or wireline communications among themselves. When any of wireless telephones 414, 416, 424, 426, and wireline telephone 434 dials a telephone number that is associated with the voice chat service of the present invention, e.g., 1-800-CHAT-NOW, the caller will be routed to CBC 412. For example, a call generated by wireless telephone 414 can go through base station 411 and MTSO 418 to reach CBC 412. If wireless telephone 426 is used to dial the telephone number, then the communication link can comprise base station 421, MTSO 428, and CBC 412. Similarly, a communication session between wireline telephone 434 and CBC 412 can involve SSP 436.

Figure 5:
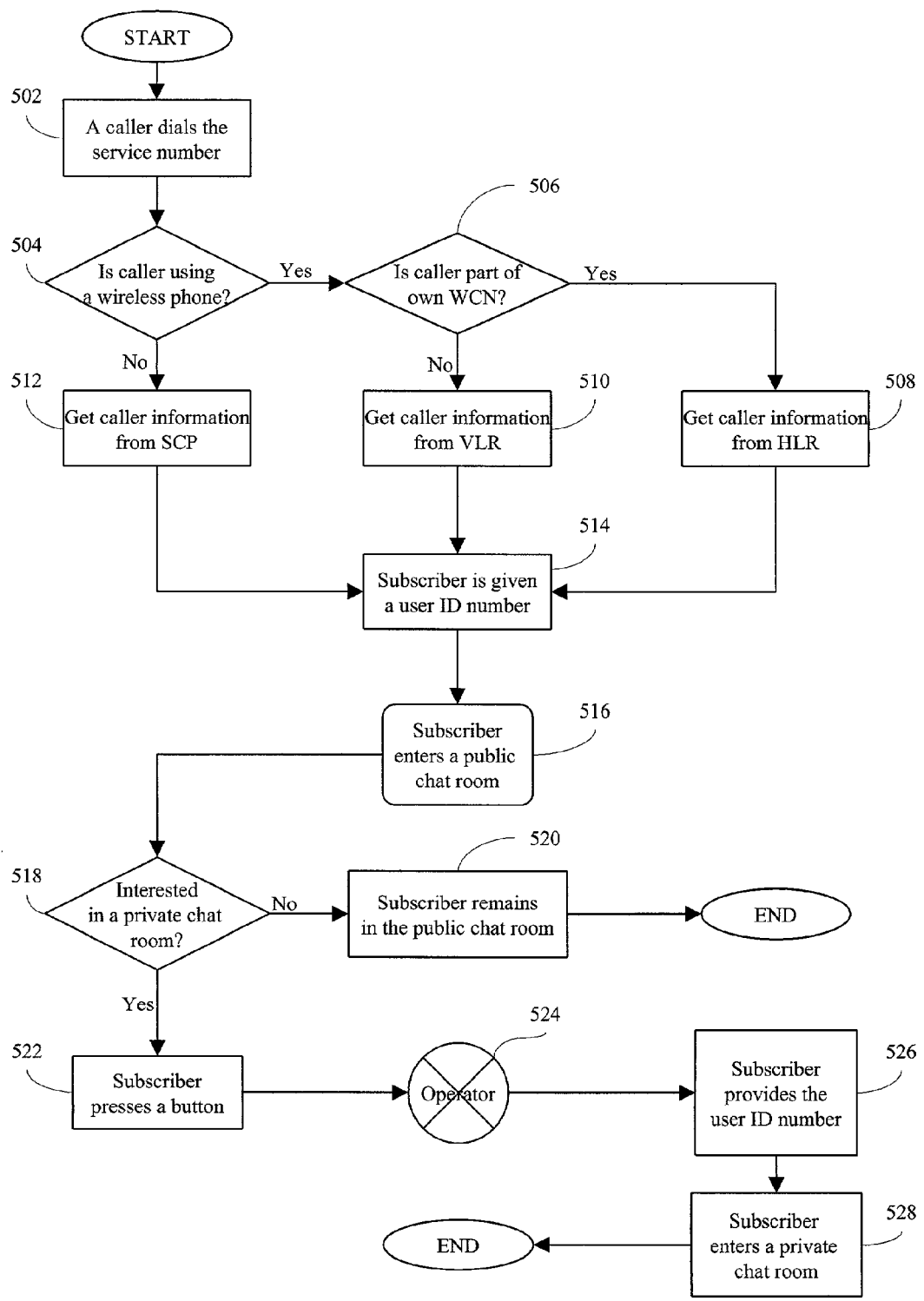
FIG. 5 is a flowchart illustrating the steps involved in using the preferred embodiment of the present invention shown in FIG. 4.

FIG. 5 is a flowchart illustrating the steps involved in using the preferred embodiment of the present invention shown in FIG. 4. In step 502, when a caller dials the telephone number of the chat service, the call can be routed to CBC 412. At CBC 412, the caller can go through a verification process to determine whether the caller is a subscriber of the voice chat service of the present invention. A number of verification methods or techniques may be used. For example, if it is determined that the caller uses a wireless telephone in step 504 to access the service, a further determination can made in step 506 whether the wireless telephone is part of WCN 410. If it is, for example wireless telephone 414 is used, then the process goes to step 508, in which the caller information can be retrieved from a HLR, e.g., HLR 415. The caller information may comprise, for example, the caller's name, the MIN of wireless telephone 414, and the caller's voice chat service subscription status.

If the caller uses a wireless telephone that is part of a different wireless network, for example wireless telephone 424 is used, the caller information and subscription status may be retrieved from VLR 413 in step 510. For customers of WCN 410, CBC 412 can allow access to the voice chat service of the present invention based on the subscriber profiles of the callers. If the caller uses a wireline telephone, e.g., wireline telephone 434 of PSTN 430, the caller information may be obtained from SCP 438 in step 512.

Another method for allowing access by non-customers of WCN 410, such as customers of WCN 420 or PSTN 430, CBC 412 may require the caller to provide a PIN that would be verified before access is granted. If the caller is not already a subscriber of the chat service, the system can invite the caller to join. Billing could be on a timed basis or based on a monthly flat fee. Preferably, the caller can be required to pay by credit card before routed to a chat room.

Once the caller is verified to be a subscriber, or the caller has been signed up as a subscriber (whether for one-time access or for a longer term subscription), the process goes to step 514, in which the subscriber can be given or assigned a user ID number that is unique to the subscriber. In step 516, the subscriber can enter a public chat room. Although not indicated in FIG. 5, the subscriber may be offered a plurality of chat rooms described above. While in a public chat room, the subscriber can listen to other chatters who are also in the public chat room. If the subscriber chooses to speak, the other chatters would hear the subscriber's voice. If in step 518 the subscriber is not interested in a private chat room, the subscriber may remain in the public chat room in step 520.

But if in step 518 the subscriber wishes to enter a private chat room with another chatter from the public chat room, the subscriber can press a button, e.g., the "#" button on the keypad of this or her telephone, and the subscriber can be routed to an operator in step 524. The subscriber can then, in step 526, provides his or her user ID number to the operator. The subscriber may also provide the user ID number of other chatters who wish to join the subscriber in the private chat room. Alternatively, each interested chatter may go through steps 522, 524, and 526 individually. In step 528, each interested chatter can be routed to the private chat room. While in the private chat room, none of the chatters in the public chat room could participate in the private conversation among the interested chatters of the private chat room.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing a voice chat room service over one or more telephone networks, the method comprising:
   receiving a call from a caller;
   verifying whether the caller is a subscriber of the voice chat room service;
   providing the caller with a menu comprising two or more public voice chat rooms that are predetermined by the service; and
   routing the caller to a public voice chat room selected by the caller if the caller is a subscriber;
   moderating the public voice chat room by a representative;
   leading at least the caller and one other participant in the public voice chat room selected by the caller to a private voice chat room; and
   charging the caller and the one other participant with additional fees for the private voice chat room.

2. The method of claim 1, further comprising the step of inviting the caller to be a subscriber if the caller is not a subscriber.

3. The method of claim 1, further comprising the step of supplying the caller with a trial membership.

4. The method of claim 1, further comprising the step of providing the caller with a user ID number.

5. The method of claim 4, further comprising the step of routing the caller to a private voice chat room when the user ID number is received from the caller.

6. The method of claim 1, further comprising the step of retrieving information associated with the caller.

7. The method of claim 6, wherein the information can be retrieved from one or more of a home location register, a visitor location register, and a service control point.

8. A method for providing a voice chat room service over one or more telephone networks, the method comprising:
   receiving a call from a caller;
   retrieving information associated with the caller;
   verifying whether the caller is a subscriber of the voice chat room service;
   inviting the caller to be a subscriber if the caller is not a subscriber;
   supplying the caller with a menu comprising two or more voice chat rooms that are predetermined by the service and wherein one or more of the chat rooms is moderated by a representative;
   routing the caller to a voice chat room selected by the caller;
   moderating the one or more voice chat rooms using rules associated with the voice chat room service;
   leading at least the caller and one other participant in the public voice chat room selected by the caller to a private voice chat room; and
   charging the caller and the one other participant with fees for the private voice chat room.

9. The method of claim 8, wherein the information can be retrieved from one or more of a home location register, a visitor location register, and a service control point.

10. The method of claim 8, further comprising the step of charging the caller for the voice chat room service a fee separate from the fee for the private voice chat room.

11. The method of claim 10, wherein the charging step is based on time spent by the caller in the one or more chat rooms.

12. The method of claim 10, wherein the charging step comprises collecting a fixed fee from the caller regardless of time spent by the caller in the one or more chat rooms.

13. The method of claim 8, further comprising the step of prompting the caller for a password.

14. A method for providing a voice chat room service over one or more telephone networks, the method comprising:
   providing a menu of multiple public voice chat rooms;
   facilitating a conversation in a public voice chat room comprising a plurality of chatters that have selected the public voice chat room from the menu;
   moderating the conversation in the public voice chat room by a representative;
   leading at least two chatters of the plurality of chatters in the public voice chat room to a private voice chat room when user ID numbers associated with the at least two chatters are received, and
   charging one or more of the at least two chatters with additional fees for the private voice chat room;
      wherein the user ID numbers can be received from one or more of the at least two chatters,
      wherein the user ID numbers comprises a temporary ID number that is given by the voice chat room service.

15. The method of claim 14, further comprising the step of retrieving one or more of the user ID numbers if the at least two chatters do not remember the one or more of the user ID numbers.

16. A system for providing a voice chat room service over one or more telephone networks, the system comprising:
   a plurality of chat rooms;
   means for verifying whether a caller is a subscriber of the voice chat room service;
   means for providing a menu comprising two or more public voice chat rooms that are predetermined by the service; and
   means for routing the caller to one of the plurality of chat rooms selected by the caller;
   means for moderating conversation in one or more of the plurality of chat rooms by a representative; and
   means for leading at least two callers to a private voice chat room and charging the at least two callers additional fees for the private voice chat room.

17. The system of claim 16, wherein each of the plurality of chat rooms is associated with a conference bridge circuit.

18. The system of claim 16, further comprising means for transferring a caller from a first chat room to a second chat room among the plurality of chat rooms.

* * * * *